United States Patent Office 3,186,905
Patented June 1, 1965

3,186,905
BACTERICIDAL AND FUNGICIDAL DICHLORO-NITRO-QUINOXALINES
Junnosuke Hattori, Toyonaka-shi, Hiroshi Sugiyama, Ashiya-shi, Kosuke Yoshioka, Hirakata-shi, and Seiji Koike, Toyonaka-shi, Japan, assignors to Sumitomo Chemical Company, Ltd., Osaka, Japan, a corporation of Japan
No Drawing. Filed June 17, 1963, Ser. No. 288,444
8 Claims. (Cl. 167—33)

This invention relates to microbicidal compositions which are widely utilizable as medicinal and agricultural microbicides. More particularly, the present invention pertains to agricultural and medicinal microbicide compositions containing one or more compounds represented by the general formula

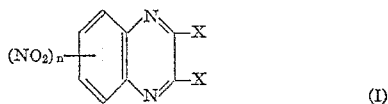

wherein X represents a halogen atom and $n$ shows an integer of 1 or 2. These compounds are less toxic to warm blooded animals and have microbicidal actions on a broad extent of microorganisms: e.g., plant pathogenic fungi, such as *Piricularia oryzae, Alternaria kikuchiana, Ophiobolus myabeanus, Pythium aphanidermatum,* and *Pellicularia filamentosa*; bacteria such as *Xanthomonas oryzae*; human parasitic fungi, such as *Trichophyton rubrum, Trichophyton tonsurans,* and *Trichophyton mentagrophytes*; and bacteria such as *Staphylococcus aureus* and *Escherichia coli.* Therefore, the preparations obtained by mixing one or more of the above compounds with a suitable adjuvant can protect plant or human from the attack of said pathogenic fungi and bacteria safely and economically.

The compounds represented by the above Formula I may be prepared either by reacting phosphorus pentahalide or phosphorus oxyhalide, or by reacting phosphorus pentahalide in phosphorus oxyhalide or phosphorus trihalide, with a compound represented by the general formula

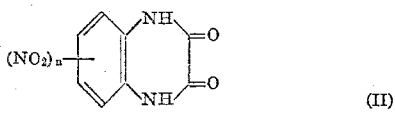

or

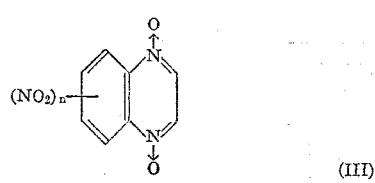

wherein $n$ is an integer of 1 or 2. Also, the effective compounds prepared by the above process have the following properties:

| Compound | Melting point, °C | Form |
|---|---|---|
| 2,3-dichloro-5-nitro-quinoxaline | 154 | White needle-like crystals. |
| 2,3-dichloro-6-nitro-quinoxaline | 152 | Do. |
| 2,3-dichloro-5,7-dinitro-quinoxaline | 215 | Yellow needle-like crystals. |

In actual use, the present microbicidal compositions are employed, for agricultural applications, in the form of preparations of emulsions, wettable powders, dusts, while for medicinal applications, in the form of preparations dusting powders, ointments and paints. The compositions for agricultural use are prepared in the following manners: Namely, the dusts are prepared by thoroughly mixing and pulverizing the active ingredients, i.e., the present compound, with one or more members selected from the group consisting of talc, bentonite, attaclay, kaolin, and diatomite. The wettable powders may be formed by thoroughly mixing two members of the active ingredient and a wetting agent or three members of the active ingredient, a wetting agent, and one member selected from the group consisting of talc, bentonite, kaolin, attaclay, vermiculite and diatomite. The emulsions are prepared by mixing the present active ingredient with an emulsifier and a solvent which well dissolves the two to form a homogeneous liquid. Further, the compositions for medicinal use are prepared by the following processes in addition to those described in the examples shown later. Namely, the ointments are prepared by dissolving the present active ingredient in, or thoroughly mixing it with one or more members selected from the group consisting of animal and vegetable fats and oils, paraffinic hydrocarbons, such as wax, Vaseline and liquid paraffin, silicon, carbowax, lanolin, plastics, glycols, higher alcohols, glycerine, water and surface active agents. The dusts are prepared by mixing and pulverizing the present active ingredient with one or two members selected from the group consisting of kaolin, diatomite, starch and zinc white. The paints are prepared by dissolving the present active ingredient in, or homogeneously mixing it with one or more members selected from the group consisting of water, ethanol, fatty oils, glycerine, soaps, surface active agents and suspending agents.

The following examples illustrate the present invention:

EXAMPLE 1

20 parts of 2,3-dichloro-6-nitro-quinoxaline, 20 parts of Triton X–177 (trade name of a produce of Rohm and Haas Co.), 20 parts of α-methylnaphthalene, and 10 parts of dioxane are thoroughly mixed to form a homogeneous agricultural emulsion containing 20% of active ingredient.

EXAMPLE 2

50 parts of 2,3-dichloro-5-nitro-quinoxaline, 45 parts of bentonite and 5 parts of an emulsifier of polyoxyethylene-nonylphenol-ether system are sufficiently mixed and pulverized to prepare an agricultural wettable powder containing 50% of active ingredient.

EXAMPLE 3

1 part of 2,3-dichloro-5,7-dinitro-quinoxaline and 99 parts of talc are thoroughly mixed and pulverized to prepare an agricultural dust containing 1% of active ingredient.

EXAMPLE 4

0.5 part of 2,3-dichloro-6-nitro-quinoxaline and 0.5 part of 2,3-dichloro-5,7-dinitro-quinoxaline are added to 99 parts of Plastibase (a mixture of polyethylene and liquid paraffin, trade name of the product of E. R. Squibb & Sons Co.) and thoroughly kneaded to prepare on ointment useful for medicinal application.

EXAMPLE 5

1 part of 2,3-dichloro-5-nitro-quinoxaline is dissolved in 99 parts of 2-methyl-2,4-pentane-diol to prepare a medicinal paste useful for external applications.

EXAMPLE 6

1 part of 2,3-dichloro-5,7-dinitro-quinoxaline and 99 parts of medicinal talc are thoroughly mixed and pulverized to prepare a dusting powder useful for medicinal applications.

When the products shown in the above examples are actually used: for example, the agricultural emulsion of Example 1 is employed by diluting it with water to 1,000 times and spraying 40 l. of the diluted emulsion per 10 a., rice blast occurring in paddy-fields can be prevented almost completely. Also, athlete's foot can be cured by applying the ointment of Example 4 to the affected parts.

The effects of the thus obtained microbicides on plant pathogenic microorganisms are shown in the following tables. Tests were carried out according to slide-germination method (refer to "Phytopathology," vol. 37, page 354) and mycelia-growth-inhibiting test method on an agar plate. The latter test method is conducted by charging an agar medium containing the corresponding microbicide into a Petri dish to form an agar plate, and inoculating in the center of the plate a colony of previously cultured test-microorganisms and observing the growth of the microorganism. The concentrations in the tables are those of active ingredients shown by p.p.m. unit.

*Table 1.—Results obtained by slide-germination method ($LC_{95}$ value)*

| | *Piricularia oryzae* | *Alternaria kikuchiana* | *Ophiobolus myabeanus* |
|---|---|---|---|
| 2,3-dichloro-6-nitro-quinoxaline | 1.0 | 1.0 | 2.0 |
| 2,3-dichloro-5,7-dinitro-quinoxaline | 0.5 | 0.5 | 1.0 |
| 2,3-dichloro-5-nitro-quinoxaline | 1.0 | 1.0 | 2.0 |

*Table 2.—Result obtained by mycelia-growth-inhibiting-test (concentration required for complete inhibition)*

| | *Pythium aphanidermatum* | *Pellicularia filamentosa* | *Corticium sasakii* | *Botrytis cinerea* |
|---|---|---|---|---|
| 2,3-dichloro-6-nitro-quinoxaline | 5.0 | 2.0 | 10.0 | 2.0 |
| 2,3-dichloro-5,7-dinitro-quinoxaline | 5.0 | 1.0 | 5.0 | 1.0 |
| 2,3-dichloro-5-nitro-quinoxaline | >10.0 | >10.0 | >10.0 | >10.0 |

Further, the results obtained by the flower pot test are shown below. Namely, the microbicides were sprayed to rice plants at a 3–4 leaves stage cultivated in flower pots of about 10 cm. in diameter. One day after the spray, the spores of *Piricularia oryzae* were inoculated, and 5 days after the inoculation, the number of spots on the leaves were counted. No phytotoxicity due to the microbicides were observed at any concentrations. The concentrations show dilution multiples of active ingredients.

*Table 3.—Results obtained by flower pot test*

| Compound | Concentration | Affected leaves (percent) | Numbers of spots per leaf | |
|---|---|---|---|---|
| | | | Developing spots | Total spots |
| 2,3-dichloro-6-nitro-quinoxaline | x 4,000 | 9 | 0.14 | 0.18 |
| | x 16,000 | 73 | 0.53 | 1.75 |
| 2,3-dichloro-5,7-dinitro-quinoxaline | x 4,000 | 7 | 0.16 | 0.19 |
| | x 16,000 | 60 | 0.40 | 1.22 |
| 2,3-dichloro-5-nitro-quinoxaline | x 4,000 | 7 | 0.21 | 0.29 |
| | x 16,000 | 71 | 0.80 | 0.93 |
| No treatment | | 79 | 3.40 | 5.98 |

Table 4 shows the microbicidal activities of the present compounds, effected by agar dilution method, against human parastic microorganism such as the fungi of Trichophyton genus, *Staphylococcus aureaus*, and *Escherichia coli*. For Trichophyton, Sabouraud agar media were used, while for others, bouillon agar media.

The concentrations for the complete growth inhibition are those of active ingredients shown by p.p.m. unit. The control employed was presently marketed 2-naphthyl ester of N-methyl-N-(1-naphthyl)-thionocarbamic acid.

*Table 4*

| Compound | *Trichophyton rubrum* | *Trichophyton tonsurans* | *Trichophyton mentagrophytes* | *Staphylococcus aureus* | *Escherichia coli* |
|---|---|---|---|---|---|
| 2,3-dichloro-6-nitro-quinoxaline | 0.1 | 0.1 | 0.2 | 25 | 50 |
| 2,3-dichloro-5,7-dinitro-quinoxaline | 0.2 | 0.2 | 0.2 | 10 | 50 |
| 2,3-dichloro-5-nitro-quinoxaline | 0.2 | 0.2 | 0.4 | 25 | 50 |
| 2-naphthyl ester of N-methyl-N-(1-naphthyl)-carbamic acid | 0.2 | 0.2 | 0.2 | >100 | >100 |

The fungistatic activity of the novel compounds examined was determined by means of the agar-dilution method. This method consists in principle of incubating a potato-agar medium containing a known amount of the fungicide with fungus spore. After six days of incubation presence or absence of growth is observed visually. The minimum concentration causing complete inhibition of growth is read.

The results obtained are presented in Table 5 below.

*Table 5*

| Compound | Minimum concentration causing complete inhibition growth, p.p.m. | | |
|---|---|---|---|
| | *Clado. fulvum* | *Glom. cingulata* | *Cercospora beticola* |
| 2,3-dichloro-6-nitroquinoxaline | 5 | 0.63 | 5 |
| 2,3-dichloro-5-nitroquinoxaline | 10 | 2 | 10 |
| 2,3-dichloro-5,7-dinitroquinoxaline | 5 | 0.63 | 5 |

What we claim is:

1. A method for protecting plants from attack of microorganisms which comprises contacting said plants with a microbicide containing as active ingredients at least one of the compounds represented by the formula

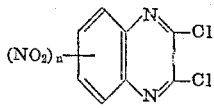

wherein $n$ is an integer of from 1 to 2.

2. The method of claim 1 wherein the microorganism is rice blast.

3. The method of claim 1 wherein the microorganism is *Ceratostomella fimbriata*.

4. The method of claim 1 wherein the microorganism is *Pythium aphanidermatum, Pellicularia filamentosa*.

5. A powdered agent comprising 99.5–95.0% by weight of carriers in a powder form and 0.5.5.0% by weight of active microbicidal ingredients consisting of at least one of the compounds represented by the formula:

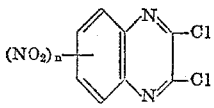

wherein $n$ is an integer of from 1 to 2.

6. An emulsion comprising 10–80% by weight of a solvent, 10–30% by weight of dispersing agents and 10–50% by weight of active microbicidal ingredients consisting of at least one of the compounds represented by the formula:

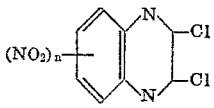

wherein $n$ is an integer of from 1 to 2.

7. Wettable powders comprising 5–85% by weight of a carrier in a powder form, 5–10% by weight of dispersing agents, and 10–90% by weight of active microbicidal ingredients consisting of at least one of the compounds represented by the formula:

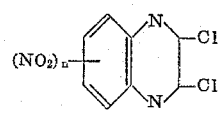

wherein $n$ is an integer of from 1 to 2.

8. A method for destroying fungi and bacteria comprising contacting the same with a microbicide containing as active ingredients at least one of the compounds represented by the formula:

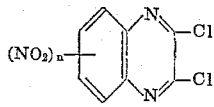

wherein $n$ is an integer of from 1 to 2.

References Cited by the Examiner

Chemical Abstracts (I) 53:13160h (1959).
Chemical Abstracts (II) 53:16142fh (1959).
Chemical Abstracts (III) 55:18741f (1961).
Chemical Abstracts (IV) 57:816–818 (1962).

JULIAN S. LEVITT, *Primary Examiner.*

LEWIS GOTTS, *Examiner.*